62-536. OR RE19,869 SR
Search Ro
Feb. 25, 1936. L. D. JONES Re. 19,869
METHOD AND APPARATUS FOR AVOIDING SHOCK CHILL IN PRECIPITATING SUBSTANCES FROM LIQUIDS
Original Filed Feb. 5, 1921
Orig. 1,558,619
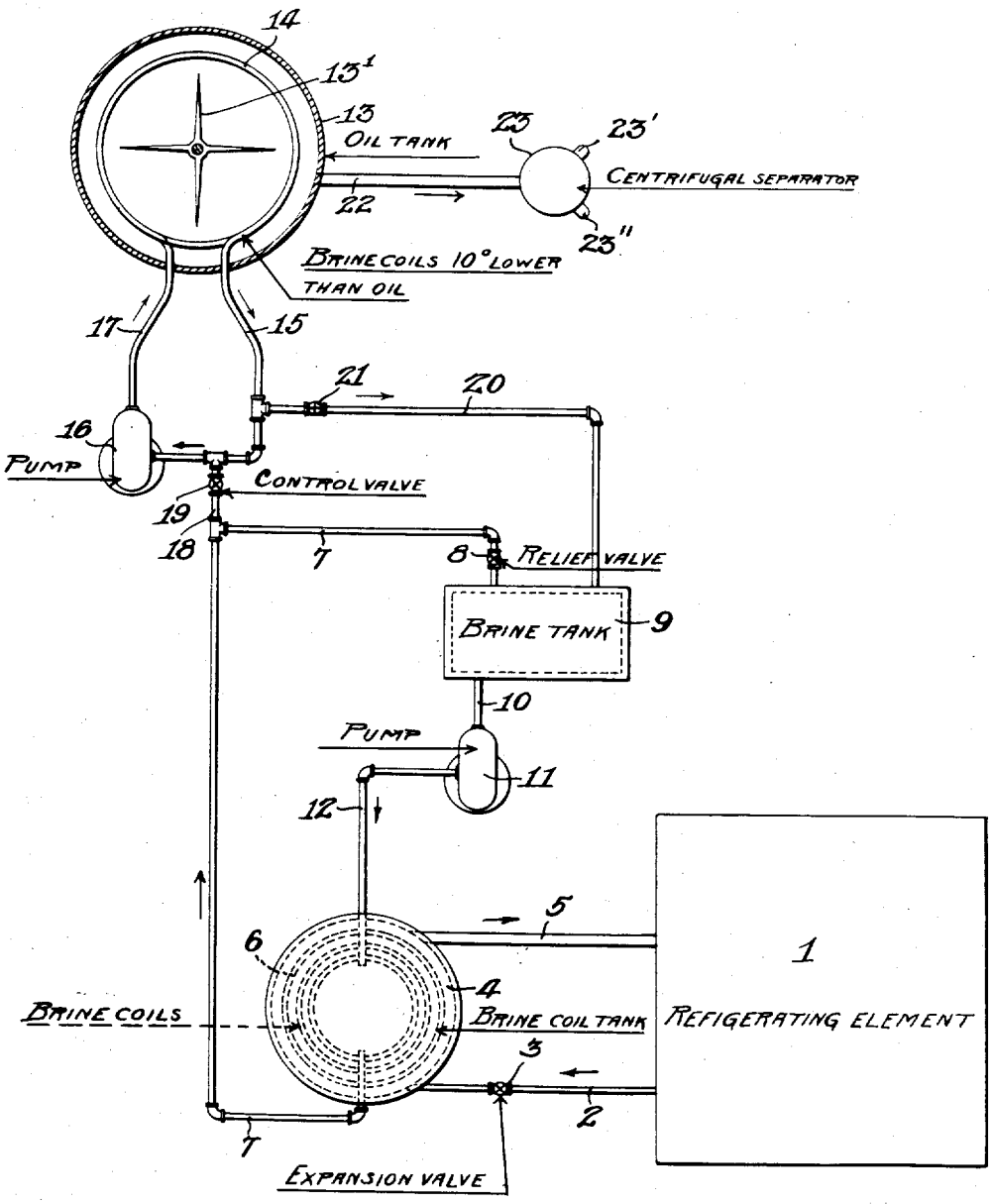
Inventor:
Leo D. Jones.
by Bruhn & Dunn
Attorneys.

62. REFRIGERATION.
173

Reissued Feb. 25, 1936

Re. 19,869

UNITED STATES PATENT OFFICE 19,869

METHOD AND APPARATUS FOR AVOIDING SHOCK CHILL IN PRECIPITATING SUBSTANCES FROM LIQUIDS

Leo D. Jones, Philadelphia, Pa., assignor to The Sharples Specialty Company, Philadelphia, Pa., a corporation of Delaware Original No. 1,558,619, dated October 27, 1925, Serial No. 442,691, February 5, 1921. Application for reissue May 5, 1934, Serial No. 724,178

10 Claims. (Cl. 62—173)

This invention is designed primarily for separating wax from petroleum products by precipitation and subsidence but it is not limited to the treatment of mineral oils and its use is contemplated in the treatment of other liquids, as in the separation of stearine from vegetable oils.

My improvements are characterized, in the preferred practice of the invention, by effecting heat transfer, between a cooling medium and the liquid containing the substance to be precipitated by cooling, in such a way, that every particle of the liquid shall be gradually reduced in temperature substantially uniformly, and also that no portion of the liquid shall come in contact with a cooling medium or surface having a temperature differing therefrom by more than a small fraction of the total temperature range through which the liquid is to be chilled. The precipitate thus obtained is separated out by centrifugal force.

In chilling liquids as heretofore practiced, whether by direct action as by boiling liquid ammonia in circulating coils in contact with the liquid to be cooled, or indirectly as by circulating refrigerated calcium or sodium chloride brine through such coils, it has been customary to control the temperature of the chilling media so that this temperature was always appreciably lower than the lowest temperature to which the liquid to be chilled was carried. Thus, if the process required the chilling of an oil to 20° F., it was customary to circulate through the system and through the chilling pipe coils in contact with the oil, brine at a temperature of approximately 10° F. If slow chillings were required, this was accomplished by limiting the amount of 10° brine flowing through the chilling coils. In this method of chilling small portions of the liquid to be chilled were chilled rapidly to the lowest required temperature.

In the precipitation of substances in liquids by chilling, as in the precipitation of the wax of petroleum products which contain wax in the so-called amorphous form, an example of such products being cylinder stock, the physical condition of the precipitate has been found in my experiments to vary with the character of the chilling operations. Where the oil or part thereof is chilled rapidly by a transfer of its heat to a cooling fluid or surface of much lower temperature, as in previous operations known to the trade and referred to in the claims as "shock chilling", the wax is precipitated in a finely divided or colloidal state with the occlusion of oil which cannot be separated centrifugally. But when the oil is reduced uniformly to the temperature required for producing a satisfactory finished product, without reducing any substantial part of it at any time substantially below the temperature of the bulk of the oil, by heat transfer to a cooling medium the temperature of which is such that at all times the difference of temperatures between the cooling medium and the oil is not more than a small fraction of the total temperature range through which the oil is being chilled, as in my invention, the wax is precipitated in a more coarsely crystalline and less colloidal state, containing much less occluded oil and in such form that it can be separated readily by centrifugal force.

The invention may be practiced by the apparatus illustrated in the accompanying drawing.

The drawing is a diagrammatic view of a chilling and centrifuging lay out adapted for the practice of the invention.

The apparatus illustrated comprises a refrigeration element 1 from which anhydrous liquid ammonia flows through the pipe 2 and the expansion valve 3 to the brine cooling tank 4, which is connected by the return pipe 5 with the element 1.

Brine coils 6 in the tank 4 form part of a circulating conduit comprising the pipe 7 containing a relief valve 8, a tank 9, a pipe 10, a pump 11 and a pipe 12, the pump circulating through the conduit the store of brine provided in the tank.

A tank 13, for the substance as oil under treatment, contains the agitator 13′ and the coils 14 which are preferably disposed so as to effect convection currents for preventing subsidence of the precipitate and assisting agitation. The coils 14 form part of a circulating conduit comprising the pipe 15, the pump 16 and the pipe 17, through which the cooling fluid is circulated by the pump.

A pipe 18, containing a valve 19, connects the pipe 7 with the pipe 15, and the latter is connected by a pipe 20 containing a valve 21 with the tank 9.

A conduit 22 connects the tank 13 with a centrifugal separator 23 which discharges through the outlets 23′ and 23″.

Ammonia passes then through the pipe 2, valve 3, tank 4, and pipe 5, and is boiled in this tank by heat transferred from brine circulated in the coils 6, the brine being forced from the tank 9 through the conduits 10, 12, 6 and 7, by the pump 11.

If the same brine is circulated continuously through pump 16, pipe 17, coils 14, and pipe 15, the brine in this system will have substantially the same temperature as that of the oil in the tank 13. In order to chill the oil in the tank 13, a small portion of cold brine from the tank 6 is admitted to this circulating system through the pipes 7 and 18 and the valve 19. This small portion of cold brine mixes with a larger portion of warm brine flowing from the coil 14 through the pipe 15, resulting in a slight reduction of the temperature of the brine entering the coil through the pipe 17. A quantity of brine passes out through the valve 21 equal to that entered through the valve 19. By the regulation of the valve 19 it is possible to control the temperature of the brine circulating through the coil 14 at a certain specified temperature relation to that of the oil in the tank 13, substantially independent of the temperature of the colder brine supplied through the valve 19. For instance, it is possible to have the oil in tank 13, at say, 70° F., and the brine circulating through the coil 14 at substantially 60° F., whereas the supply of refrigeration in the form of brine passing through the valve 19 may be at −20° F.

The amount of surface of the coil 14 and the capacity of the pump 16 are to be so arranged preferably that the temperature difference between the oil and the brine entering the tank and between the oil and the brine leaving the tank shall be approximately the same or not widely different, and so that the temperature difference between the oil and the average temperature of the brine in the coil shall not be more than a small fraction of the total temperature through which the oil is chilled when the oil in the tank 13 is being chilled at a satisfactory rate.

The oil, when chilled as above described, to a temperature which will give a satisfactory finished product, is discharged from the tank 13 through the pipe 22 to the separator 23 in which it is centrifuged, the oil and the wax separated therefrom by centrifugal force being discharged through the respective outlets 23′ and 23″.

In practice, the temperature of the brine circulated through the coils 14 is preferably not more than say 10° F. lower than the temperature of the oil in the tank, the temperature of the brine circulated in the coils being lowered as the temperature of the oil falls.

As a concrete example of the practice of the process, two parts of cylinder stock having a pour test of say 100° F. and three parts of gasoline are heated together to a temperature of say 100° F. The product is chilled gradually through a period of say 48 hours to a temperature of say −10° F., by a transfer of heat through the coils 14 to brine therein having a temperature that is regulated so that it is preferably not more than 10° F. lower than the oil, the temperature of the brine being lowered relatively as the temperature of the oil falls.

From the foregoing it is apparent that by the practice of this invention there is produced a precipitate, particularly from oil containing amorphous wax, (an example of such oil being the cylinder stock referred to above), and especially when the oil is diluted, which is sufficiently discontinuous to facilitate separation of the precipitate from the liquid; and that such a precipitate is produced by ensuring at all times between the beginning of the precipitation and the completion of a major proportion of the precipitation that the rate at which heat is withdrawn is sufficiently low in all parts of the liquid and that the difference in temperature between the refrigerant and the liquid is so low that the precipitate will not be so finely divided or colloidal as to be incapable of removal.

I claim:

1. The method of treating liquid containing a substance precipitable by cooling which comprises forming a discontinuous precipitate of said substance in the liquid by reducing the temperature thereof at a substantially constant rate by heat absorption in refrigerant cooled at a rate bearing a substantially constant relation to changes in the temperature of the liquid.

2. The method of treating liquid containing a substance precipitable by cooling which comprises the absorption of heat therefrom in a refrigerant maintained at a temperature insufficient for "shock chilling" the liquid cooled thereby and never differing in temperature from such liquid by more than a small fraction of the total temperature range through which the liquid is chilled.

3. The method of treating oil containing a waxy substance which comprises forming a discontinuous waxy precipitate therein by heat absorption therefrom in a refrigerant having a temperature maintained at a point incapable of effecting "shock chilling" of oil cooled thereby, and dispersing the precipitate by the formation of currents in the oil.

4. The method of treating wax-containing oil which comprises the absorption of heat therefrom in a refrigerant never differing in temperature from the oil by more than a small fraction of the total temperature range through which the oil is chilled, and maintaining such refrigerant at a temperature bearing a substantially constant relation to the temperature of the oil by mixing small quantities of cold refrigerant with the first named refrigerant.

5. In apparatus for cooling liquids, a liquid reservoir, a refrigerant circulating system for cooling liquid in said reservoir, a second refrigerant circulating system supplying refrigerant to said first system, and means comprising connections and controls between said systems for circulating refrigerant from each of said systems through the other and regulating the temperature in said first named system.

6. In apparatus for the precipitation of wax from oils, an oil reservoir, an agitator for agitating oil in said reservoir, a refrigerant circulating system for cooling oil in said reservoir, a second refrigerant circulating system comprising a refrigerant cooler and a tank, means connecting said first named system with said second named system between said cooler and tank, and means connecting said first named system with said tank.

7. The method of treating a body of liquid containing a substance precipitable therein by cooling, which comprises extracting heat from the liquid at a rate sufficiently low from substantially all portions of the liquid to avoid shock chilling thereof, by absorbing said heat in a refrigerant of which the temperature does not differ from that of the liquid by more than a small fraction of the total temperature range through which the liquid is chilled.

8. The method of treating a body of liquid containing a substance precipitable by cooling, which comprises extracting heat from the liquid by absorption in a refrigerant and during substantially all of the time between the beginning of the precipitation of the substance and the completion 62. REFRIGERATION,
173
Search Ro of the precipitation of a major proportion thereof maintaining the rate of extraction of heat from the liquid sufficiently low from substantially all portions of the liquid to avoid shock chilling thereof and maintaining the refrigerant at a temperature which does not differ from that of the liquid by more than a small fraction of the total temperature range through which the liquid is chilled.

9. The method of treating a body of oil containing wax, which comprises extracting heat from the oil by absorption in a refrigerant and during substantially all of the time between the beginning of the precipitation of the wax and the completion of the precipitation of a major proportion thereof maintaining the rate of extraction of heat from the oil sufficiently low from substantially all portions of the oil to avoid shock chilling thereof and maintaining the refrigerant at a temperature which does not differ from that of the oil by more than a small fraction of the total temperature range through which the oil is chilled.

10. The method of treating a body of oil containing a substantial proportion of amorphous wax, which comprises extracting heat from the oil by absorption in a refrigerant and during substantially all of the time between the beginning of the precipitation of the wax and the completion of the precipitation of a major proportion thereof maintaining the rate of extraction of heat from the oil sufficiently low from substantially all portions of the oil to avoid shock chilling thereof and maintaining the refrigerant at a temperature which does not differ from that of the oil by more than a small fraction of the total temperature range through which the oil is chilled.

LEO D. JONES.